United States Patent
Cox et al.

(10) Patent No.: US 9,715,831 B2
(45) Date of Patent: Jul. 25, 2017

(54) PERMANENT WIRELESS COMMUNICATIONS SYSTEM FOR AN AIRCRAFT EQUIPPED WITH A WHEEL DRIVE SYSTEM

(71) Applicants: Isaiah W. Cox, London (GB); Joseph J. Cox, Portland, OR (US); Joseph Goldman, Pikesville, MD (US); Jan Vana, Prague (CZ)

(72) Inventors: Isaiah W. Cox, London (GB); Joseph J. Cox, Portland, OR (US); Joseph Goldman, Pikesville, MD (US); Jan Vana, Prague (CZ)

(73) Assignee: Borealis Technical Limited, Gibraltar (GI)

( * ) Notice: Subject to any disclaimer, the term of this patent is extended or adjusted under 35 U.S.C. 154(b) by 374 days.

(21) Appl. No.: 14/341,768

(22) Filed: Jul. 26, 2014

(65) Prior Publication Data

US 2015/0221224 A1    Aug. 6, 2015

(51) Int. Cl.
*B64C 25/50* (2006.01)
*G08G 5/00* (2006.01)
(Continued)

(52) U.S. Cl.
CPC ......... *G08G 5/0013* (2013.01); *B64C 25/405* (2013.01); *G08G 5/0021* (2013.01); *G08G 5/065* (2013.01); *H04B 7/18506* (2013.01)

(58) Field of Classification Search
USPC .......................... 244/50, 103 R, 100 R; 701/3
See application file for complete search history.

(56) References Cited

U.S. PATENT DOCUMENTS 6,553,307 B2 * 4/2003 Stratton .................. B64F 1/002
                                                              701/120
6,657,334 B1   12/2003 Edelson
(Continued)

FOREIGN PATENT DOCUMENTS

GB           2457144 A      8/2009

OTHER PUBLICATIONS

Flightcom Corp, "Wireless Pushback System", www.flightcom.net/ground-support/pushback, 2014, Portland, OR.

*Primary Examiner* — Christopher P Ellis

(57) ABSTRACT

A permanent wireless onboard to ground operations communications system is provided for an aircraft equipped with a pilot-controllable drive wheel drive system for autonomous ground movement without reliance on the aircraft's engines or external tow vehicles, including an onboard wireless communications link installed to remain permanently with the aircraft designed to interface wirelessly with ground personnel at any airport, aerodrome, or airfield where the aircraft lands immediately upon landing. The permanent wireless onboard to ground operations communications system provides a substantially instantaneous connection between a pilot and ground personnel to facilitate guidance of pilot-controlled autonomous ground movement during taxi, parking in nose-in and parallel orientations, and pushback without reliance on visual signals. The present communications system establishes and maintains cockpit to ground communications during pilot-controlled autonomous aircraft ground movement to enhance the safety of ramp operations and improve the speed at which ramp operations can be safely conducted.

9 Claims, 1 Drawing Sheet

(51) Int. Cl.
*B64C 25/40* (2006.01)
*H04B 7/185* (2006.01)
*G08G 5/06* (2006.01)

(56) References Cited

U.S. PATENT DOCUMENTS

| | | | |
|---|---|---|---|
| 6,838,791 B2 | 1/2005 | Edelson | |
| 7,116,019 B2 | 10/2006 | Edelson | |
| 7,445,178 B2 | 11/2008 | McCoskey et al. | |
| 7,469,858 B2 | 12/2008 | Edelson | |
| 7,891,609 B2 * | 2/2011 | Cox | B64C 25/405 |
| | | | 244/100 R |
| 7,975,960 B2 | 7/2011 | Cox | |
| 8,109,463 B2 | 2/2012 | Cox | |
| 9,293,055 B2 * | 3/2016 | Nutaro | G08G 5/065 |
| 9,394,059 B2 * | 7/2016 | Cox | B64D 45/00 |
| 2004/0208603 A1 * | 10/2004 | Hekkel | H04B 10/1125 |
| | | | 398/140 |
| 2005/0253021 A1 * | 11/2005 | McCoskey | B64C 25/405 |
| | | | 244/137.1 |
| 2006/0065779 A1 * | 3/2006 | McCoskey | B64F 1/32 |
| | | | 244/100 R |
| 2006/0273686 A1 | 12/2006 | Edelson | |
| 2009/0218440 A1 * | 9/2009 | Dilmaghani | B64C 25/405 |
| | | | 244/50 |
| 2009/0261197 A1 * | 10/2009 | Cox | B64C 25/36 |
| | | | 244/50 |
| 2012/0168557 A1 * | 7/2012 | Edelson | B64C 25/405 |
| | | | 244/50 |
| 2012/0217339 A1 * | 8/2012 | Gilleran | B64C 25/405 |
| | | | 244/50 |
| 2013/0200209 A1 * | 8/2013 | Goldman | B64C 25/405 |
| | | | 244/50 |

* cited by examiner

PERMANENT WIRELESS COMMUNICATIONS SYSTEM FOR AN AIRCRAFT EQUIPPED WITH A WHEEL DRIVE SYSTEM

PRIORITY CLAIM

This application claims priority from International Patent Application No. PCT/US2014/014742, filed 4 Feb. 2014, now withdrawn, the disclosure of which is fully incorporated herein by reference.

TECHNICAL FIELD

The present invention relates generally to communications between an aircraft cockpit crew and ground personnel during aircraft ground operations and specifically to an onboard to ground operations communications system installed in an aircraft equipped with a wheel drive system for autonomous ground travel that is designed to interface universally with ground operations communications in any airport where the aircraft lands.

BACKGROUND OF THE INVENTION

Airports, aerodromes, and airfields today can be very congested spaces and must often support ground operations of a larger number of aircraft than the facility was originally designed to handle. Directing all of this ground traffic efficiently and safely requires effective communication between an aircraft's cockpit crew, ground control, and ground operations personnel. In most airports, multiple landing aircraft must be safely directed from touch down locations along and across runways and taxiways to a gate or other parking location while multiple departing aircraft are simultaneously pushed back and directed to takeoff locations, often along and across the same runways. The operation of airlines and airports today focuses on achieving maximum efficiency to keep operating costs as low as possible while continuing to provide travelers with a safe and economical mode of travel. It is desired to keep the time an aircraft spends on the ground at an airport between arrival at and departure from the gate to the minimum required to unload arriving passengers and cargo, service the aircraft, and load departing passengers and cargo. Minimizing this turnaround time not only reduces delays in airline flight schedules, but also increases the possibility that an airline can schedule additional flights, providing travelers with more options and improving airline profits. Increased aircraft ground traffic, however, may be accompanied by an increased risk of ground incidents involving aircraft, ground vehicles, and even passengers and ground personnel. Consequently, reducing aircraft turnaround time should not be at the expense of increased ground safety risks.

Establishing and maintaining communications between an aircraft flight crew and ground operations personnel is particularly important in an airport ramp area. The ramp entry or exit area, which is the area adjacent to a taxiway and leading to or from an airport's gates or terminal is, according to some studies, the location of most ground incidents. At this location, taxi lines leading into and out of the gate area converge, and an aircraft is less likely to be in communication with air traffic or other controllers. Flight crew are more likely at this point to be relying on an airline's ramp control procedure or ground personnel input for guidance. The largest percentage of incidents in one study occurred within 20 feet of the nose wheel parking line, within the gate stop area, when the flight crew is typically relying entirely on ground personnel guidance and signals for clearance from obstacles and for final taxi instructions. Ramp congestion caused by increasing numbers of flights, stringent aircraft scheduling requirements, and efforts to squeeze large jets into gates originally designed for much smaller aircraft contributes to traffic jams and reduced maneuvering space in the ramp area. Current requirements for the pushback tugs and tow vehicles needed to move departing aircraft away from gates, as well as requirements for other ground vehicles, add to ramp congestion. Increased ramp congestion may be exacerbated by poor communication and inadequate numbers of ground personnel, leading to the likelihood of increased ramp incidents. Establishing and maintaining effective communication between an aircraft's cockpit crew and ground personnel operating tugs and ground service vehicles is essential if airport ground operations are to be conducted efficiently and safely.

One study found that more incidents occur during aircraft arrival than during departure. One possible explanation for this is that there may be more obstacles for an aircraft to encounter when entering the congested area next to gates and terminal buildings. Another reason may be related to the large number of pushback, power-out, and power-turn procedures that are currently conducted during departure operations while arriving aircraft are entering the ramp area. Communication between an aircraft's flight crew and ground personnel may not have been as clearly established as it should have been. It has been estimated that ramp incidents and injuries cost airlines about US$10 billion each year.

Ramp safety, and airport ground safety generally, can be significantly compromised by the potential hazards associated with the operation of an aircraft's engines to move an aircraft on the ground, especially from jet blast and engine ingestion when aircraft engines are kept in operation, even at idle speeds. The attachment and subsequent detachment of pushback tugs or tow vehicles from departing aircraft can also impact ground safety. Incidents resulting from these potential hazards can be completely avoided, and communication between an aircraft's flight crew and ground operations personnel can be clearest and most effective, only when the aircraft engines are shut down and remain off. Maintaining effective communications between an aircraft's flight crew and ground personnel in a ramp area is critical for safe aircraft ramp operations.

The use of a drive means, such as a motor structure, mounted with a wheel to rotate the wheel an aircraft and move the aircraft on the ground without operation of the aircraft's main engines has been proposed. U.S. Pat. No. 7,445,178 to McCoskey et al, for example, describes electric nose wheel drive motors intended to drive aircraft during taxi. U.S. Pat. No. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, owned in common with the present invention, describe aircraft drive systems that use electric drive motors to power aircraft wheels and move an aircraft on the ground without reliance on aircraft main engines or external tow vehicles. While eliminating the use of an aircraft's engines to move an aircraft into and out of a ramp area should avoid the aforementioned hazards and improve the safety of ramp operations, the foregoing art does not suggest the additional improvements in safety and efficiency of ground operations that can be achieved by equipping an aircraft with a drive wheel drive system for autonomous ground movement and an effective wireless onboard to ground communication system useful to assist in guiding the aircraft as it moves without engines or tow vehicles.

Communications systems to enable ground personnel to direct the travel of incoming and outgoing aircraft in the ramp area are available. Such systems range from hand signals used by ground personnel, including wing walkers and others, to voice communications transmitted between ground personnel and an aircraft's flight crew. An airport ramp where aircraft use their engines to power movement into and out of the ramp area can be a very noisy environment, and voice communications transmissions can be difficult to hear, even with headphones and other equipment intended to block out background noise. The potential for miscommunication of important information can be significant. While advances in communication technology have produced some improvements, as long as aircraft engines are operating, there will be a high level of noise in the ramp area.

One currently available communication system, supplied by Flightcom Corp. of Portland, Oreg., is a wireless pushback communication system that includes the aircraft's Interphone and is designed to enable and control communication among ground personnel, an aircraft's flight crew, and a pushback tug or tractor operator during the pushback process. A portable communications module is provided for use in the aircraft cockpit to connect wireless, Interphone, and a pushback tug or tractor operator during the pushback process. When the pushback process has been completed, the module is removed from the aircraft. The communication module is not intended to remain on the aircraft and specifically includes alerts that communicate to an aircraft flight crew that the module has been left onboard and should be removed. There is no suggestion, moreover, that this communication system could be part of a substantially permanent onboard to ground operations wireless communication system installed in an aircraft and designed to interface universally with ground communications systems to increase ground travel efficiency in aircraft equipped with drive wheel drive systems for autonomous ground operations, including taxi and pushback.

A need exists for a permanent onboard to ground operations wireless communications system installed in an aircraft that is designed to interface universally with virtually all airport, aerodrome, and airfield ground operations communications systems to establish and maintain effective communication between an aircraft's pilot or flight crew and ground personnel during ground operations. Such a communications system is needed to improve efficiency of taxi, parking near a terminal, and pushback in any airport, aerodrome, or airfield where an aircraft equipped with both an onboard to ground wireless communications system and a pilot-controlled drive wheel drive system for autonomous ground movement lands.

SUMMARY OF THE INVENTION

It is a primary object of the present invention, therefore, to overcome the deficiencies of the prior art and to provide a universal permanent wireless communications system to establish and maintain effective communication between an aircraft's flight crew and ground personnel in an aircraft equipped with a pilot-controlled drive wheel drive system for autonomous ground movement at any airport, aerodrome, or airfield where the aircraft lands, whereby pilot-controlled ground movement of the aircraft can be facilitated.

It is another object of the present invention to provide a wireless communications system installed in an aircraft equipped with a drive wheel drive system for autonomous ground movement controllable by the aircraft's flight crew that provides a permanent onboard wireless communications link that permanently enables communications between the aircraft flight crew and ground personnel during ramp ground operations and decreases time an aircraft spends during taxi, parking maneuvers, and pushback.

It is an additional object of the present invention to provide a wireless onboard to ground operations communications system for an aircraft equipped with a pilot-controlled wheel drive system and a permanent wireless onboard communications link designed to interface universally with ground operations communications systems at any airport where the aircraft lands to guide an aircraft pilot or flight crew to control aircraft autonomous movement in direct communication with ground personnel during taxi, parking maneuvers, and pushback.

It is a further object of the present invention to provide universally established and maintained onboard to ground wireless communications during ground operations between a flight crew of an aircraft equipped with a pilot-controlled drive wheel drive system for autonomous ground movement and ground personnel during taxi and pushback at any airport, aerodrome, or airfield where the aircraft lands.

It is yet a further object of the present invention to provide a wireless communications system for an aircraft equipped with a pilot-controlled drive wheel drive system for autonomous taxi and pushback that includes a wireless flight crew voice link which remains with the aircraft and enables the pilot or cockpit crew to communicate with ground personnel anywhere the aircraft lands without relying on visual signals as the pilot is guided by ground personnel to control autonomous taxi, parking, or pushback of the aircraft.

It is yet another object of the present invention to increase the safety and efficiency of aircraft and airport ramp operations by providing a wireless onboard to ground operations communications system in an aircraft equipped with a pilot-controlled drive wheel drive system for autonomous ground movement that is capable of establishing an instantaneous connection between an aircraft pilot and ground personnel upon landing, during parking, and prior to pushback, thereby improving the speed, efficiency, and safety with which cockpit to ground communications can be conducted.

In accordance with the aforesaid objects, a wireless onboard to ground operations communications system for an aircraft equipped with a pilot-controlled drive wheel drive system for autonomous ground movement is provided that includes a permanent onboard wireless communications link installed in the aircraft that is designed to interface universally with ground operations communications systems at any airport, aerodrome, or airfield where the aircraft lands. The wireless onboard to ground operations communications system enables ground personnel to facilitate pilot or cockpit crew-controlled autonomous taxi in a forward direction, parking, and pushback without reliance on visual signals. The present communications system universally establishes and maintains cockpit to ground communications during substantially all pilot-controlled autonomous aircraft ground movement, not only enhancing the safety of ramp operations, but also improving the speed at which ramp operations can be safely conducted.

Other objects and advantages will be apparent from the following description, claims, and drawings.

DESCRIPTION OF THE INVENTION

Figure 1:
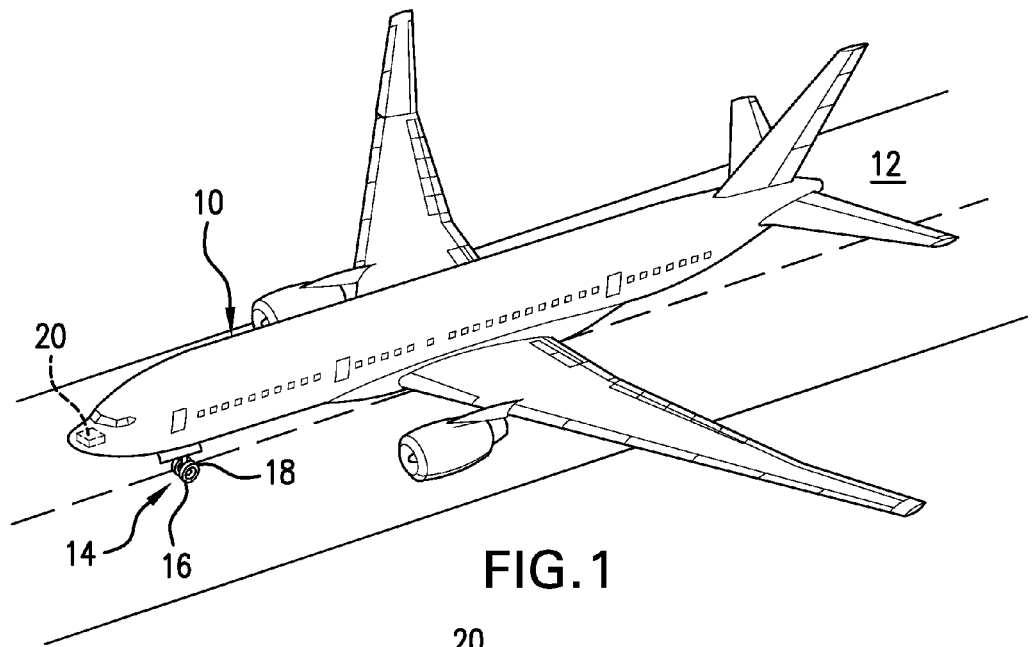
FIG. 1 is a side perspective view of an aircraft equipped with a drive wheel drive system for autonomous ground movement following landing at an airport, aerodrome, or airfield moving autonomously on a runway, wherein the aircraft has been equipped with a universal onboard to ground operations communications system in accordance with the present invention.

An aircraft landing at today's airports, aerodromes, and airfields requires the power provided by its main engines to move the aircraft on the ground from its touchdown point to a parking location. Upon departure, aircraft are usually pushed back in reverse from the parking location by a tug or tow vehicle until the aircraft can use power from its engines to move in a forward direction to a takeoff location. In some situations, a departing aircraft may use reverse engine thrust instead of a tug to back away from its parking location and turn so the engines can be set to forward thrust to move the aircraft forward to its takeoff location. The establishment and maintenance of clear communications between and among an aircraft's flight crew and ground operations personnel responsible for guiding an aircraft into and out of an airport ramp area are challenging in this noisy environment and usually rely on a combination of audio and visual signals. Many such communications systems may use a designated radio frequency and/or a telephone to enable voice communication between an aircraft's flight crew and those ground personnel at an airport responsible for directing the aircraft's ground travel between arrival at and departure from an airport ramp area. There is presently little, if any, uniformity in onboard to ground communication systems among all of the airports, aerodromes, and airfields where an aircraft is likely to land. As a result, an aircraft's flight crew must take the time required to establish communication with those who direct ground operations each time the aircraft lands at a different airport, thus increasing the time an aircraft spends on the ground and/or in ground operations.

As noted above, it has been proposed to move aircraft autonomously on the ground between landing and takeoff without the use of the aircraft's main engines or external tow vehicles. Eliminating the need for tugs or tow vehicles can significantly decrease the time an aircraft must spend on the ground, particularly during pushback and in parking maneuvers and prior to takeoff. An aircraft's total ground time can be reduced further if the aircraft, in addition to being equipped with a drive wheel drive system for autonomous ground movement, is also permanently equipped with an onboard to ground operations communication system, preferably a wireless system that remains with the aircraft and is designed to universally interface and enable communication between the aircraft and any ground operations communication system at any airport, aerodrome, or airfield where the aircraft lands. The present invention provides this capability.

In accordance with the present invention, an aircraft is equipped with one or more drive wheel drive systems designed to drive one or more aircraft nose and/or main landing gear wheels. The preferred drive wheel drive systems are directly controllable by the aircraft pilot or another flight crew member to drive the aircraft autonomously on the ground without reliance on the aircraft's main engines or external tow vehicles. The aircraft is additionally equipped with a permanent wireless onboard to ground operations communications system including a module that remains with the aircraft and is designed to universally interface with ground operations communications systems at virtually any airport, aerodrome, or airfield where the aircraft is likely to land.

One preferred aircraft drive wheel drive system includes a roller traction drive system functionally disposed between a drive means and a clutch assembly that is enclosed completely within a space created by the arrangement of wall sections of an aircraft wheel, as described and shown in copending International Patent Application No. PCT/US13/51407, filed 19 Jul. 2013, entitled ROLLER TRACTION DRIVE SYSTEM FOR AN AIRCRAFT DRIVE WHEEL DRIVE SYSTEM, the disclosure of which is incorporated herein by reference. A preferred drive means includes a rotating element, such as a rotor, and a stationary element, such as a stator. A drive means preferred for use with the aircraft drive wheel drive system of the present invention is an electric motor assembly that is capable of operating at high speed and could be any one of a number of suitable designs. An exemplary drive means is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range to move an aircraft wheel and, therefore, an aircraft autonomously and to function as described herein may also be suitable drive means in an aircraft wheel drive system. A high phase order electric motor of the kind described in, for example, U.S. Pat. Nos. 6,657,334; 6,838,791; 7,116,019; and 7,469,858, the disclosures of the aforementioned patents being incorporated herein by reference, can be effectively used as a drive means 36. Another example of a suitable drive means 36 is a high phase order induction motor with a top tangential speed of about 15,000 linear feet per minute and a maximum rotor speed of about 7200 rpm, although drive means capable of a wide range of such speeds could also be used. Other drive means, including hydraulic and/or pneumatic drive means, are also contemplated to be within the scope of the present invention. Power for an electric drive means is preferably supplied by an aircraft's auxiliary power unit (APU), although other suitable sources of power may also be used.

A drive system suitable for driving one of the drive means described above may be the preferred roller traction drive system, which performs essentially the same functions that would be performed by gearing or a gear system. Alternatively, the drive system could be a gear system, an arrangement of gearing, or another equivalent type of drive system. The replacement of gearing by a roller traction drive system in an aircraft drive wheel drive system presents many advantages. A roller traction drive system designed to actuate a drive means capable of moving a commercial sized aircraft on the ground not only has a low profile and is light weight, but also provides the high torque and high speed change ratio required to optimally operate a non-engine drive means to move an aircraft on the ground. A clutch assembly is provided that can be activated automatically or manually to engage and disengage the roller traction drive or other drive system into and out of actuation with the drive means so that the drive means is actuated to drive an aircraft wheel to move the aircraft on the ground. When appropriate, the drive means should be de-actuated so that it is unable to drive the aircraft wheel. The roller traction drive system should only be engaged by the clutch assembly to actuate the drive means when the aircraft is actually on the ground, such as after landing and prior to takeoff, and when the aircraft is traveling at a desired speed during ground travel.

When an aircraft equipped with a drive wheel drive system and an onboard to ground operations communications system as described herein lands at an airport, aerodrome, or airfield, the aircraft pilot or another flight crew member shuts off the aircraft's main engines and controls activation of the drive wheel drive system to actuate the drive means to move the aircraft autonomously from its landing location to a parking destination, typically at a gate or other airport ramp location. At departure, the pilot also controls the drive wheel drive system to move the aircraft in a forward direction or, alternatively, first in a reverse and then in a forward direction from a gate or other parking location out of the ramp area to a takeoff runway. The pilot or flight crew controls ground movement of the aircraft by directly controlling operation of the aircraft wheel drive system. To optimize direct control of aircraft ground movement, the pilot and flight crew need an onboard to ground operations communications system that provides a direct communication link between the airport's ground operations personnel and the aircraft flight crew. In the quieter ramp environment possible when aircraft taxi, parking maneuvers, and pushback are controlled by a pilot-directed drive wheel drive system and not by the aircraft's engines, wireless two way communications between the cockpit crew and ground personnel can quickly, safely, and efficiently guide an aircraft into and out of the ramp area.

A preferred onboard to ground communications system for this purpose may include a wireless communications system module designed to interface universally with ground communications systems at all of the airports, aerodromes, or airfields where an aircraft is likely to land and to provide a wireless voice link with these ground communications systems. The preferred wireless onboard to ground operations communications system is designed to include a wireless communications system module that is permanently installed onboard an aircraft in a location that is readily accessible by the pilot and flight crew. This communications system module is designed for and intended to remain with the aircraft. A preferred location is the aircraft cockpit, but the wireless communications system module could also be permanently installed in other aircraft locations as well. The preferred wireless communications system module, unlike available cockpit to ground communications systems that are removable, is a dedicated aircraft component and remains installed in place on the aircraft so that it is usable wherever an aircraft lands and must communicate with ground personnel.

Additionally, unlike currently available onboard to ground communications systems that rely primarily or solely on visual communications, such as hand signals from ground personnel and the flight crew's view from the cockpit, the present invention allows the pilot to talk to ground personnel without relying only or primarily on visual communication as the pilot directly controls the ground movement of the aircraft. The elimination of engine noise as an aircraft equipped with a drive wheel drive system as described above moves into and out of a ramp area also eliminates the need for noise cancelling headphones and allows voice communications to be heard significantly more clearly than was possible in the past as ground personnel guide the pilot-controlled taxi, parking, and pushback. Not only is the time previously required to identify and connect to an airport's ground operations communications system no longer required, but the quicker, clearer communications possible with the present invention are also accompanied by important safety benefits.

The present onboard to ground operations communications system additionally results in significantly quicker, safer aircraft movements into and out of the ramp area. With the present invention, a pilot can move a drive wheel drive system-equipped aircraft in only a forward direction into and out of a parking space at a gate or stand, with ground personnel confirming through the communications system that the area is clear of ground vehicles, stairs, and the like. When the pilot must maneuver an aircraft in a reverse direction during a pushback by directly controlling actuation of the drive means to move the aircraft autonomously in reverse, the quiet ramp environment and the direct wireless voice communication link with ground personnel enable the rapid and accurate exchange of information. This enhanced ability to detect the presence of ground vehicles, other aircraft, and/or safety hazards in the aircraft's forward or reverse path can significantly minimize the likelihood of incidents and enhances ramp safety. The conventional taxi-in process can also be facilitated by the clearly audible wireless voice communications possible between an aircraft's pilot and ground personnel as the pilot controls the drive wheel drive system of an arriving aircraft in conjunction with ground personnel guidance to maneuver the aircraft more quickly and safely to a gate or other parking location than has heretofore been possible.

A wireless onboard to ground operations communication system module preferred for the present invention should preferably enable all ground personnel responsible for facilitating pilot-controlled taxi or pushback of an aircraft to hear and be in constant communication with the pilot and flight crew and with each other. Selectively activatable voice communication between ground personnel responsible for different ground operations functions and/or between ground personnel and the flight crew could also be provided. The selective activation of and/or access to the present onboard to ground operations communications system by specifically identified ground personnel can be determined, for example, by an aircraft pilot based on airport protocol and/or airport ramp conditions at the time of taxi-in or pushback.

An aircraft controllable by a pilot to move autonomously on the ground without its main engines or pushback tugs needs far fewer ground personnel to guide its ground travel upon arrival or during pushback than in the past. Ground personnel may function more as facilitators, helping the pilot control taxi and pushback in ramp areas and confirming the pilot's visual assessments. Consequently, the number and frequency of communications between the aircraft flight crew and ground personnel may be reduced, while the speed with which aircraft can be assisted to arrive or depart is increased. Hand signals may also be used to enhance and/or augment the preferred wireless voice communications. Communications from an aircraft's cockpit to ground personnel involved in ground operations tasks other than facilitating pilot-controlled aircraft ground movement are also improved by the present invention. Consequently, the likelihood of occurrence of ramp incidents should be significantly reduced with implementation of the present wireless onboard to ground communication system in aircraft equipped with a drive wheel drive system for autonomous ground movement.

Referring to the drawings, FIG. 1 illustrates an aircraft 10 that has landed on a runway 12 at an airport, aerodrome, or airfield and is taxiing to a parking destination at the airport, aerodrome, or airfield. The aircraft 10 is equipped with both an onboard drive wheel drive system for autonomous control of ground movement and has installed a permanent wireless communications system designed to universally interface with ground communications systems to provide two way communications at all of the airports, aerodromes, and/or airfields where the aircraft is likely to land. The aircraft 10 has a nose landing gear, indicated at 14 with a pair of wheels 16. One or both of the nose wheels 16 may be equipped with a wheel drive system 18, preferably with a non-engine drive means, a drive system, and a clutch assembly (not shown), as described above, so that each equipped nose wheel is a drive wheel capable of being controlled directly by the aircraft pilot to move the aircraft autonomously on the ground. One or both of the aircraft's main wheels (not shown) could, alternatively or additionally, be equipped with wheel drive systems. A wireless communication system module, represented at 20 and designed to interface universally with any airport, aerodrome, or airfield ground operations communication system, may be permanently installed in the aircraft cockpit and provides wireless two way communication between the aircraft pilot and/or flight crew and ground personnel at an airport, aerodrome, or airfield upon landing. It is anticipated that communication will be established between the aircraft permanent wireless communication system module 20 and an airport's ground operations communications system upon landing without requiring modifications or adaptations to enable connections with each airport's ground operations communication system.

An onboard to ground operations communications system according to the present invention preferably additionally includes a number of individual ground operations communications units that can be worn or carried by individual ground personnel crew members. The individual ground communications units are preferably wireless headsets with attached microphones that may be adjustable to be worn by more than one ground crew member. Other individual wireless communications units, such as, for example, hand held units similar in size and configuration to mobile phones, as well as other individual communications units that can establish and maintain communication with the aircraft onboard communications module and with other individual ground personnel communications units could also be used. The quieter ramp environment produced by the absence of operating aircraft engines enables the potential use of a range of different individual communications devices. The individual communications units are preferably selectively activatable as needed to transmit and/or receive and, thereby, control communication access with a specific aircraft's onboard communications module, preferably limiting access to those ground personnel crew members actively involved in that specific aircraft's taxi, pushback, or other ground operations.

Figure 2:
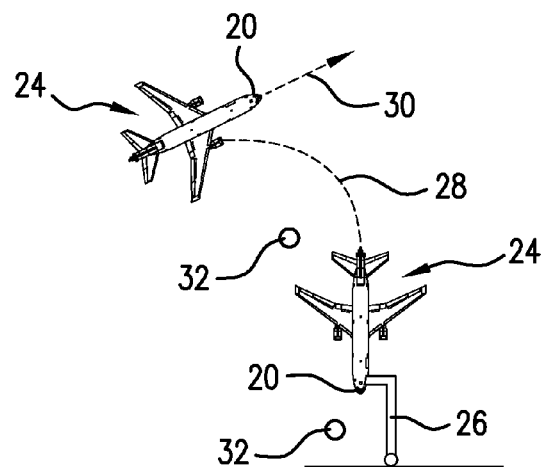
FIG. 2 is a view of an airport ramp area showing an aircraft equipped with a drive wheel drive system for autonomous ground movement in a first position parked at a jet bridge at a terminal gate and in a second position following pushback in a reverse direction from the gate.

FIG. 2 illustrates an airport ramp area adjacent to a terminal 22 with an aircraft 24 parked at a passenger loading bridge or jet bridge 26. The aircraft 24, which is equipped with a drive wheel drive system as described herein, is shown in the parked position at the jet bridge 26 that would be achieved during a taxi-in operation that would be controlled by the aircraft's pilot operating the drive wheel drive system to move the aircraft autonomously from a touch down location to the jet bridge 26. The pilot would, in addition, use the aircraft permanent wireless communication system module 20 to communicate with ground personnel to assist with guiding the aircraft safely to the nose in orientation shown. Ground vehicles, such as, for example, baggage carriers and fuel trucks, are not shown, but would also be present and functioning in the ramp area while the aircraft 24 and other aircraft, also not shown, are being guided through ground operations with the present wireless onboard to ground communication system. It is in this area where the improvements in communication between an aircraft cockpit crew and ground personnel possible with the present invention can produce substantial improvements in the safety of ramp operations, as well as significant reductions in the amount of time aircraft spend in the area. Aircraft 24 has taxied from a runway, such as runway 12 in FIG. 1, with instructions to park at a gate connected to the jet bridge 26. When aircraft 24 receives clearance for departure and pushback through the communications system module 20, the aircraft pilot controls operation of the aircraft's wheel drive system to move the aircraft in a reverse direction, such as along the path represented by dashed line 28, to a location, indicated by the aircraft 24, where the aircraft can change travel direction and taxi autonomously to a takeoff runway. Some ground personnel, represented by circles 32, may be assigned to assist and advise the pilot that the area along paths 28 and 30 is clear of ground vehicles, aircraft stairs, other aircraft, and the like. The aircraft 24 pilot and flight crew may maintain a communications connection with the ground personnel 32 through the communications system module 20 during this process.

Figure 3:
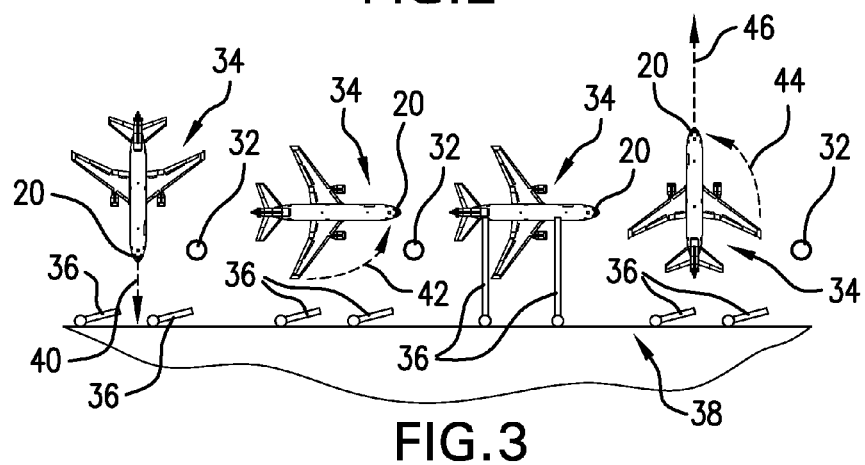
FIG. 3 is a view of an airport ramp showing an aircraft equipped with a drive wheel drive system for autonomous ground movement maneuvering in a forward direction into a parking orientation parallel to an airport terminal to enable connection of the aircraft to two jet bridges to facilitate passenger transfer.

FIG. 3 shows an aircraft 34 equipped with a drive wheel drive system 18 for autonomous ground movement as described herein and a permanent wireless communication system module 20 maneuvering into a parking location at a terminal 38. The terminal 38 has a number of spaced folding or collapsible jet bridges 36 designed for attachment to aircraft doors to provide passenger transfer between the aircraft 34 and the terminal 38. The aircraft 34 maneuvers into a parking space by taxiing in only a forward direction as indicated until the aircraft is oriented with its longest axis parallel to the terminal 38 and its doors (not shown) are aligned with two adjacent jet bridges 36. The pilot of aircraft 34 controls the drive wheel drive system to move the aircraft first toward the terminal 38 along the path represented by arrow 40 and then turns the nose of the aircraft along the path indicated by arrow 42 so that the aircraft is parallel to the terminal as shown. Ground personnel, represented by circles 32, may be positioned in one or more locations where they can best communicate with the pilot through the permanent wireless communication system and confirm that the area where the aircraft will be moving is clear. Ground vehicles and other equipment likely to be present near the terminal are not shown for clarity. When the aircraft 34 is parked parallel to the terminal 38 so that its doors are aligned with two jet bridges 36, both the front and rear aircraft doors can be used to unload and load passengers, which increases the efficiency with which these processes can be accomplished. When the aircraft 34 has been cleared for departure, pushback is not needed. The aircraft 34 is driven by the pilot controlling the drive wheel drive system to move in a forward direction to turn away from the terminal 38, such as along the path indicated by the arrow 44, and then to move out of the ramp area, such as along path 46. The pilot of aircraft 34 is guided by ground personnel 32 through the present communications system to a takeoff runway or other location where the aircraft's engines may be safely started for takeoff.

The wireless communication system module 20 on the aircraft 10, 24, and 34, shown in the drawings, interfaces with the airport ground operations communication system upon landing to establish two way communications between the aircraft cockpit crew and ground personnel, such as ground personnel 32 and/or other ground crew. The pilot of an aircraft can communicate by voice with ground personnel crew members, who are preferably wearing wireless headsets or like wireless communications devices that provide a ground to cockpit communications interface with the wireless onboard communications system module 20 so that ground personnel can assist the pilot with autonomous taxi of the aircraft into and out of a terminal gate or other available parking location, thus facilitating efficient ramp operations. As indicated above, other individual wireless communications devices could also be provided to ground personnel crew members. Pilots or other flight crew members of aircraft equipped with drive wheel drive systems and permanent wireless communication system modules can also communicate with any ground personnel who have interfacing communications headsets, as appropriate, to receive instructions regarding access to gates or parking spaces. Using aircraft 24 in FIG. 2 as an example, as the aircraft 24 is guided to push back autonomously without a tug or its main engines and then to proceed in a forward direction to its takeoff runway, ground personnel 32 and any other ground personnel crew members equipped with interfacing communications devices can communicate the presence and location of other aircraft or ground obstructions through the onboard communications system module 20 to the pilot or flight crew of aircraft 24 so that aircraft 24 can move autonomously in reverse away from the gate safely. Because the pilot and/or flight crew of aircraft 34 move the aircraft only in a forward direction, they may have a clear view of where the aircraft is moving, and ground personnel essentially confirm clearance of the area while the pilot controls the aircraft 34 to proceed to a takeoff runway. The combination of a controllable onboard drive wheel drive system and a permanent universally interfaceable wireless onboard to ground operations communication system provide system and method whereby the safety, speed, and effectiveness of airport ramp operations may be significantly improved.

While the present invention has been described with respect to preferred embodiments, this is not intended to be limiting, and other arrangements and structures that perform the required functions are contemplated to be within the scope of the present invention.

INDUSTRIAL APPLICABILITY

The permanent universally interfaceable aircraft onboard to ground operations wireless communications system of the present invention will find its primary applicability as a permanent dedicated communications system component that enables an aircraft equipped with pilot-controllable onboard drive wheel drive systems to autonomously and independently drive aircraft on the ground and communicate immediately upon landing with communication systems of virtually any airport, aerodrome, or airfield where the aircraft lands. Aircraft ground travel, particularly during taxi, parking maneuvers, and pushback maybe conducted in ramp areas at any airport, aerodrome, or airfield used by an aircraft with minimal assistance from airport ground personnel, so that the safety, speed, and effectiveness of aircraft and airport ground operations is enhanced and improved.

The invention claimed is:

1. An aircraft communications system for aircraft equipped with landing gear wheel-mounted wheel drive systems for driving the aircraft during ground travel without reliance on aircraft engines and tow vehicles that is universally interfaceable with ground operations communications systems at all airports, aerodromes, and airfields where the aircraft lands, comprising:

a. an aircraft equipped with a pilot-controllable drive wheel drive system mounted completely within one or more landing gear wheels of said aircraft to drive the aircraft during ground travel between landing and takeoff, wherein said drive wheel drive system comprises a drive system functionally disposed between a drive motor and a clutch assembly enclosed completely within a space created by an arrangement of wall sections within said one or more landing gear wheels;

b. a permanent wireless onboard aircraft communications system module comprising a dedicated aircraft component permanently installed in a location accessible by the pilot or a flight crew of the aircraft configured to be universally interfaceable and to instantaneously provide a wireless voice link with ground operations communications systems at all airports, aerodromes, and airfields where the aircraft lands; and c. a wireless ground operations communication system at each of said airports, aerodromes, or airfields where the aircraft lands in universal interfacing communication with said permanent wireless onboard aircraft communications system module, comprising a plurality of ground personnel communication devices in two way wireless communication with said universally interfaceable permanent wireless onboard aircraft communications system module.

2. The system of claim 1, wherein said drive motor comprises an electric motor capable of high torque operation across a desired speed range mounted completely within at least one of said aircraft's nose landing gear wheels or at least one of said aircraft's main landing gear wheels.

3. The system of claim 1, wherein said plurality of ground personnel communication devices comprises a plurality of individual communications units in selective two way communication with only selected ones of said plurality of individual communications units and with said permanent onboard wireless aircraft communications system module.

4. The system of claim 3, wherein said permanent onboard wireless aircraft communications system module is selectively activatable to establish and maintain wireless two way communication between said permanent onboard wireless aircraft communications system module and said selected ones of said plurality of individual communications units.

5. The system of claim 1, wherein said plurality of ground personnel communication devices comprise wireless headsets or wireless hand held communications devices.

6. A method for improving efficiency and safety of ramp operations and reducing aircraft total ground time when aircraft equipped with equipped with landing gear wheel-mounted wheel drive systems for driving the aircraft during ground travel without reliance on aircraft engines and tow vehicles can communicate with ground operations immediately after landing at any airport, aerodrome, or airfield, comprising:

a. equipping an aircraft with a pilot-controllable drive wheel drive system mounted completely within one or more landing gear wheels of said aircraft to drive the aircraft during ground travel between landing and takeoff comprising at least a drive system functionally disposed between a drive motor and a clutch assembly enclosed completely within a space created by an arrangement of wall sections within said one or more landing gear wheels;

b. providing a wireless onboard to ground aircraft communications system comprising an aircraft communications system module universally interfaceable with ground operations communications systems at all airports, aerodromes, and airfields where the aircraft lands, and permanently mounting the universally interfaceable aircraft communications system module in an onboard location accessible by a pilot or flight crew in the aircraft;

c. providing in the ground operations communications systems a plurality of individual ground personnel communication units in interfacing wireless communication with the universally interfaceable aircraft communications system module;

d. after the aircraft lands at an airport, aerodrome, or airfield, shutting down the aircraft's engines, instantaneously establishing wireless two way communication between the permanent universally interfaceable aircraft communications system module and the airport, aerodrome, or airfield ground operations communications system, controlling the drive wheel drive system by the pilot, and driving the aircraft with the drive wheel drive system to a ramp area;

e. maintaining the wireless two way communication between the pilot and selected ground personnel with the plurality of individual communication units and using the wireless two way communication to guide the pilot driving the aircraft with the drive wheel drive system into a ramp parking area and parking the aircraft in a selected parking orientation at an airport terminal; and d. continuing to maintain the wireless two way communication between the pilot and the selected ground personnel and guiding the pilot driving the aircraft with the drive wheel drive system out of the ramp parking area.

7. The method of claim 6, further comprising selectively activating the two way wireless communication between the pilot and the selected ground personnel by the pilot to limit two way communications between the pilot and one or more of the selected ground personnel as required to guide the aircraft into or out of the selected parking orientation and during push back.

8. The method of claim 6, further comprising maintaining the wireless two way communication between the pilot and the selected ground personnel with the plurality of individual communication units and, using the wireless two way communication, guiding the pilot to drive the aircraft with the drive wheel drive system in a forward direction into the ramp parking area and park the aircraft in a parking orientation with a longest axis parallel to the airport terminal, and then guiding pilot-controlled turning and movement of the aircraft to drive the aircraft with the drive wheel drive system in a forward direction out of the ramp area to a takeoff location.

9. The method of claim 6, further comprising maintaining the wireless two way communication between the pilot and the selected ground personnel with the plurality of individual communication units and, using the wireless two way communication, guiding the pilot to drive the aircraft with the drive wheel drive system in a forward direction into the ramp parking area and park the aircraft in a parking orientation with a longest axis perpendicular to the airport terminal, and then guiding pilot-controlled movement of the aircraft to drive the aircraft with the drive wheel drive system in a reverse direction out of the ramp area and then in a forward direction to a takeoff location.

* * * * *